(12) United States Patent
Shoykhet

(10) Patent No.: US 9,362,788 B2
(45) Date of Patent: Jun. 7, 2016

(54) MICRO-CHANNEL HEAT EXCHANGER INTEGRATED INTO STATOR CORE OF ELECTRICAL MACHINE

(71) Applicant: Baldor Electric Company, Fort Smith, AR (US)

(72) Inventor: Boris A. Shoykhet, Beachwood, OH (US)

(73) Assignee: Baldor Electric Company, Fort Smith, AR (US)

( * ) Notice: Subject to any disclaimer, the term of this patent is extended or adjusted under 35 U.S.C. 154(b) by 562 days.

(21) Appl. No.: 13/827,560

(22) Filed: Mar. 14, 2013

(65) Prior Publication Data

US 2014/0265662 A1   Sep. 18, 2014

(51) Int. Cl.
*H02K 1/20*   (2006.01)
*H02K 9/12*   (2006.01)

(52) U.S. Cl.
CPC .. *H02K 1/20* (2013.01); *H02K 9/12* (2013.01); *H02K 2213/03* (2013.01)

(58) Field of Classification Search
CPC ............. H02K 1/20; H02K 5/20; H02K 9/00; H02K 9/10; H02K 9/16; H02K 9/18; H02K 9/19; H02K 9/193
USPC ................ 310/59, 58, 62, 63, 60 A, 216.053, 310/216.055, 216.056
See application file for complete search history.

(56) References Cited

U.S. PATENT DOCUMENTS

| | | | |
|---|---|---|---|
| 1,448,700 A | 3/1923 | Seidner | |
| 6,515,384 B1 | 2/2003 | Kikuchi et al. | |
| 7,530,156 B2 | 5/2009 | Rippel et al. | |
| 7,538,457 B2 | 5/2009 | Holmes et al. | |
| 2005/0067905 A1 | 3/2005 | Maney et al. | |
| 2006/0026820 A1* | 2/2006 | Rippel | H02K 1/20 310/216.004 |
| 2007/0013241 A1* | 1/2007 | Schiferl | H02K 9/19 310/58 |
| 2008/0278011 A1 | 11/2008 | Elgas et al. | |
| 2011/0031831 A1 | 2/2011 | Humer et al. | |
| 2011/0316367 A1* | 12/2011 | Takahashi | H02K 9/19 310/54 |
| 2012/0080964 A1* | 4/2012 | Bradfield | H02K 1/20 310/58 |

* cited by examiner

*Primary Examiner* — Michael Andrews
(74) *Attorney, Agent, or Firm* — Thompson Coburn LLP

(57) ABSTRACT

An electric machine has a stator that comprises a plurality of laminations with an outer periphery, and each of the laminations has teeth about a central opening such that when the laminations are stacked side-by side to form the stator core, the plurality of teeth of adjacent laminations cooperate to form slots disposed circumferentially about the central opening that are configured to receive a plurality of stator windings. Each of the laminations has a plurality of cooling apertures angularly spaced about the central opening. The cooling apertures of adjacent laminations cooperate to form cooling manifolds that extend along a length of the stator core. A portion of the laminations has their cooling apertures offset from other laminations in the stack in a manner to create a plurality of flow path transverse to the manifolds and angularly between laminations and adjacent manifolds.

22 Claims, 15 Drawing Sheets

| | The stator with $N_{slot}=72$. | | | | | | | | | | | | | |
|---|---|---|---|---|---|---|---|---|---|---|---|---|---|---|
| $i=$ | 2 | 3 | 4 | 5 | 6 | 7 | 8 | 9 | 10 | 11 | 12 | 13 | 14 | 15 |
| $N_x$ | | | | | | | | | | | | | | |
| 3 | | | | | | | | | | | | 0.54 | 0.58 | 0.63 |
| 4 | | | | | | | | | 0.56 | 0.61 | 0.67 | 0.72 | 0.78 | 0.83 |
| 5 | | | | | | | 0.56 | 0.63 | 0.69 | 0.75 | 0.83 | 0.83 | 0.97 | |
| 6 | | | | | | 0.58 | 0.67 | 0.75 | 0.83 | 0.92 | | | | |
| 7 | | | | | 0.56 | 0.66 | 0.78 | 0.88 | 0.97 | | | | | |
| 8 | | | | 0.56 | 0.67 | 0.78 | 0.88 | | | | | | | |
| 9 | | | | 0.63 | 0.75 | 0.88 | | | | | | | | |
| 10 | | | 0.58 | 0.69 | 0.83 | 0.97 | | | | | | | | |
| 11 | | | 0.61 | 0.76 | 0.92 | | | | | | | | | |
| 12 | | | 0.67 | 0.83 | | | | | | | | | | |
| 13 | | 0.54 | 0.72 | 0.90 | | | | | | | | | | |
| 14 | | 0.58 | 0.78 | 0.97 | | | | | | | | | | |
| 15 | | 0.63 | 0.83 | | | | | | | | | | | |
| 16 | | 0.67 | 0.89 | | | | | | | | | | | |
| 17 | | 0.71 | 0.94 | | | | | | | | | | | |
| 18 | | 0.75 | | | | | | | | | | | | |
| 19 | 0.53 | 0.79 | | | | | | | | | | | | |
| 20 | 0.56 | 0.83 | | | | | | | | | | | | |
| 21 | 0.58 | 0.88 | | | | | | | | | | | | |
| 22 | 0.61 | 0.92 | | | | | | | | | | | | |
| 23 | 0.64 | 0.96 | | | | | | | | | | | | |
| 24 | 0.67 | | | | | | | | | | | | | |
| 25 | 0.69 | | | | | | | | | | | | | |
| 26 | 0.72 | | | | | | | | | | | | | |
| 27 | 0.75 | | | | | | | | | | | | | |
| 28 | 0.78 | | | | | | | | | | | | | |
| 29 | 0.81 | | | | | | | | | | | | | |
| 30 | 0.83 | | | | | | | | | | | | | |
| 31 | 0.86 | | | | | | | | | | | | | |
| 32 | 0.89 | | | | | | | | | | | | | |
| 33 | 0.92 | | | | | | | | | | | | | |
| 34 | 0.94 | | | | | | | | | | | | | |
| 35 | 0.97 | | | | | | | | | | | | | |

FIG. 15

| $N_{slot}$=72 | | | | | | | | | | | | | | | |
|---|---|---|---|---|---|---|---|---|---|---|---|---|---|---|---|
| $i=$ | 1 | 16 | 17 | 18 | 19 | 20 | 21 | 22 | 23 | 24 | 25 | 26 | 27 | 28 | 29 | 30 |
| $N_v$ | | | | | | | | | | | | | | | | |
| 2 | | | | | 0.63 | 0.66 | 0.66 | 0.61 | 0.64 | 0.67 | 0.69 | 0.72 | 0.75 | 0.78 | 0.81 | 0.83 |
| 3 | | 0.67 | 0.71 | 0.75 | 0.79 | 0.83 | 0.88 | 0.92 | 0.96 | | | | | | | |
| 4 | | 0.89 | 0.94 | | | | | | | | | | | | | |
| 65 | 0.94 | | | | | | | | | | | | | | | |
| 66 | 0.88 | | | | | | | | | | | | | | | |
| 67 | 0.81 | | | | | | | | | | | | | | | |
| 68 | 0.75 | | | | | | | | | | | | | | | |
| 69 | 0.69 | | | | | | | | | | | | | | | |
| 70 | 0.63 | | | | | | | | | | | | | | | |
| 71 | 0.58 | | | | | | | | | | | | | | | |

FIG. 16

| Possible values of parameter $\xi$ for a stator with $N_{slot}$=48. | | | | | | | | | |
|---|---|---|---|---|---|---|---|---|---|
| $i=$ | 2 | 3 | 4 | 5 | 9 | 11 | 15 | 22 | 23 |
| $N_v$ | | | | | | | | | |
| 2 | | | | | | | | 0.88 | 0.69 |
| 3 | | | | | | | 0.78 | | |
| 4 | | | | | | 0.9 | | | |
| 5 | | | | | 0.78 | | | | |
| 9 | | | | 0.78 | | | | | |
| 11 | | | 0.88 | | | | | | |
| 15 | | 0.78 | | | | | | | |
| 22 | 0.88 | | | | | | | | |
| 23 | 0.69 | | | | | | | | |

FIG. 17

MICRO-CHANNEL HEAT EXCHANGER INTEGRATED INTO STATOR CORE OF ELECTRICAL MACHINE

STATEMENT REGARDING FEDERALLY SPONSORED RESEARCH OR DEVELOPMENT

This invention was made with Government support under DE-AR0000191 awarded by DOE. The Government has certain rights in this invention.

BACKGROUND AND SUMMARY

This disclosure relates generally to the field of electric motors and generators, and to methods and apparatus for cooling such. For example, the disclosure discusses a technique for dissipating heat in motors and generators by routing fluid along internal surfaces of a stator core. Although the present discussion focuses on electric motors and generators, the present invention affords benefits to a number of applications related to lamination stacks and to the cooling of such stacks.

During operation, conventional motors and generators generate heat. Indeed, the physical interaction of the devices various moving components produces heat by way of friction. Additionally, the electromagnetic relationships between the stator and the rotor produce currents that, in turn, generate heat due to resistive heating, for example. As yet another source of heat, AC magnetic fields lead to losses in the magnetic steel supporting the windings and conductors in the stator and rotor, respectively. The heat is removed by the motor cooling system.

The main magnetic path in an electric motor or generator is generally through the magnetic material that supports the stator or rotor conductors. This magnetic material makes up the stator and rotor core. To reduce magnetic flux produced losses, which generate heat, the magnetic core is laminated, with the lamination plane being in the same plane as the direction of the main magnetic flux path. In conventional radial air gap motors and generators, the stator and rotor core are, therefore, constructed from laminations that are assembled into an axial stack (i.e., a lamination stack).

The exemplary laminations are supported in a frame and cooperate with one another to form a lamination stack. Each exemplary lamination comprises a central aperture sized to receive a rotor, and a plurality of slots disposed circumferentially about the central aperture. These slots are configured to receive a plurality of windings. As will be described in greater detail below, additional apertures may be made in the laminations, and the laminations may be stacked in such a way, that the cooperation of the apertures in adjacent laminations forms a heat exchanger with relatively large axial channels, and relatively small angular channels, connecting the axial channels. The relatively large axial channels will be referred to as manifolds, while the relatively small angular channels will be referred to as micro-channels. The micro-channels extend through the stator core as they are formed by cooperation between appropriately configured apertures located within the stator lamination. The manifolds extend longitudinally through the stator lamination stack and radially inboard of the outer peripheral surface of the stack. The width of the micro-channels may be equal to the lamination thickness or a multiple of the lamination thickness (e.g., twice the lamination thickness); the proper choice of the micro-channel width depends on the specific design.

The arrangement of lamination stacks may create supply and discharge manifolds. The supply manifold may feed two adjacent discharge manifolds, and the discharge manifold may collect the coolant from two adjacent supply manifolds. With a proper choice of the dimensions, the flow in all micro-channels may essentially be the same. The cooling may mainly occur in the micro-channels. The coolant may enter the micro-channels at a temperature corresponding essentially to the overall stator coolant inlet temperature. As the coolant in the micro-channel warms up, it may leave the micro-channels at a temperature corresponding essentially to the overall stator coolant outlet temperature. A header may distribute the colder inlet flow into the supply manifolds and collect the hotter outlet flow from the discharge manifolds. The coolant flow pattern in the manifolds may be arranged to form a counter-flow heat exchanger or a parallel flow heat exchanger.

Accordingly, by routing fluid through the micro-channel heat exchanger formed in the stator, a mechanism for cooling the radially outward regions of the lamination stack that forms the stator is provided. Advantageously, the surface area of the micro-channel heat exchanger may be 1-2 orders of magnitude larger than the outer surface of the motor. Additionally, the small width of the micro-channels results in high value of the film coefficient. Additionally, the split of the total flow into a very large number of parallel streams decreases the pressure required to drive the flow through the heat exchanger. As a result, a highly efficient heat exchanger is integrated into the lamination stack.

BRIEF DESCRIPTION OF THE DRAWINGS

The accompanying drawings, which are incorporated in and form a part of the specification, illustrate the embodiments. In the drawings:

FIGS. 15-17 provide tables of information correlating a number of cooling apertures, the dimensions of the cooling apertures and the number of stator teeth.

DETAILED DESCRIPTION

As discussed in detail below, the embodiments provide apparatus and methods for cooling high power density electric machines having lamination stacks. Although the discussion focuses on electric motors and generators, these principles may also afford benefits to a number of applications in which the cooling of a lamination stack is a concern. Accordingly, the following discussion relates to exemplary embodiments and, as such, should not be viewed as limiting the appended claims to the embodiments described.

Figure 1:
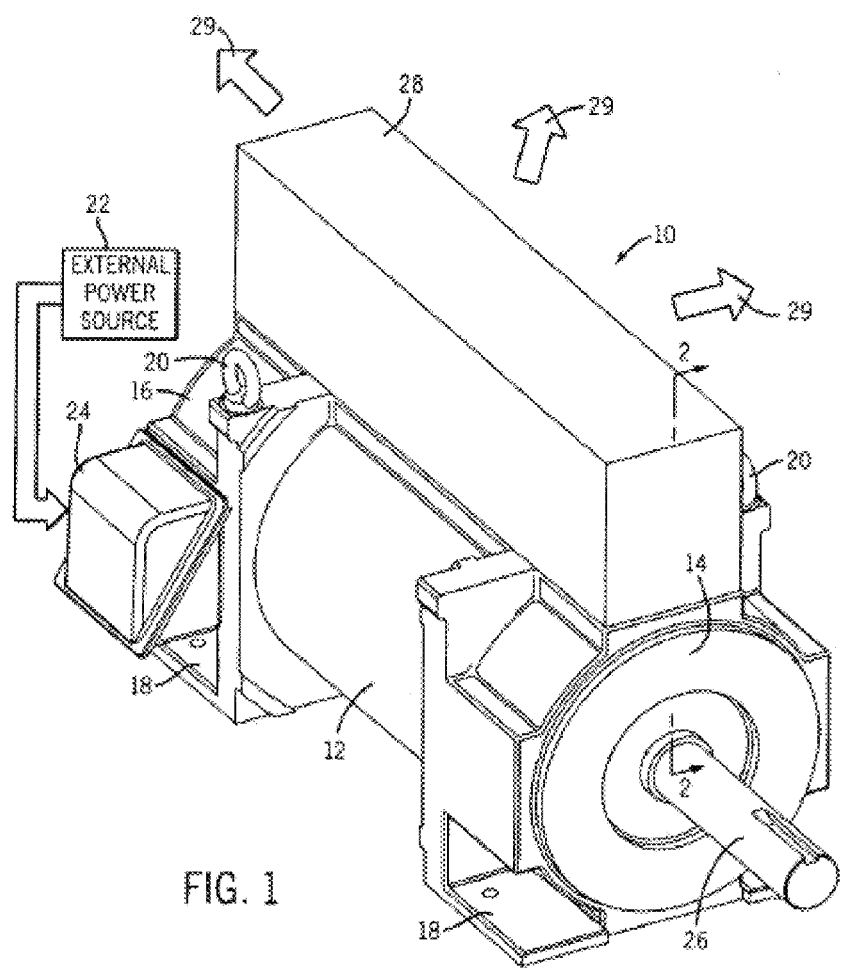
FIG. 1 illustrates a perspective view of an exemplary electric motor.

Turning to the drawings, FIG. 1 illustrates an exemplary electric motor 10. In the embodiment illustrated, the motor 10 comprises an induction motor housed in a motor housing. The exemplary motor 10 comprises a frame 12 capped at each end by drive-end and opposite drive-end endcaps 14,16, respectively. The frame 12 and the endcaps 14,16 cooperate to form the enclosure or motor housing for the motor 10. Additionally, if desired, the frame 12 and the endcaps 14,16 may be configured to form a hermetically sealed enclosure for the motor 10. The frame 12 and the front and rear endcaps 14 and 16 may be formed of any number of materials, such as steel, aluminum, or any other suitable structural material. The endcaps 14,16 may include mounting and transportation features, such as the illustrated mounting flanges 18 and eyehooks 20. Those skilled in the art will appreciate in light of the following description that a wide variety of configurations and devices may employ the cooling and construction techniques outlined below.

To induce rotation of the rotor, current is routed through stator windings disposed in the stator. (See FIG. 2.) These stator windings are electrically interconnected to form groups, which are, in turn, interconnected in a manner generally known in the pertinent art. The stator windings are further coupled to terminal leads (not shown), which electrically connect the stator windings to an external power source 22. This external power source may provide any number of types and levels of suitable power. The external power source 22 may comprise an AC pulse width modulated (PWM) inverter as well as an adjustable frequency power source. A conduit box 24 houses the electrical connection between the terminal leads and the external power source 22. The conduit box 24 comprises a metal or plastic material and, advantageously, provides access to certain electrical components of the motor 10. Routing electrical current from the external power source 22 through the stator windings produces a magnetic field that induces rotation of the rotor. A rotor shaft 26 coupled to the rotor rotates in conjunction with the rotor. That is, rotation of the rotor translates into a corresponding rotation of the rotor shaft 26. As appreciated by those of ordinary skill in the art, the rotor shaft 26 may couple to any number of driven machine elements, thereby transmitting torque to the given driven machine element. By way of example, machines such as pumps, compressors, fans, conveyors, and so forth, may harness the rotational motion of the rotor shaft 26 for operation. Alternatively, as appreciated by those of ordinary skill in the art, rotation of a magnetized rotor induces current in the stator windings and allows the electrical machine to act as a generator.

During operation, the motor 10 generates heat. By way of example, the physical interaction between various components of the motor 10 generates heat via friction. Additionally, current in the stator windings as well as in the rotor generates heat via resistive heating. Moreover, in the case of AC motors, eddy currents developed in the stator laminations and as well as hysteresis losses in the stator also produce heat. If left unabated, excess heat leads to a degradation in performance of the motor 10 and, in certain instances, may lead to malfunction of the motor. To improve heat dissipation, the illustrated motor 10 carries a cooling assembly 28 mounted to the motor housing and configured to convectively cool the motor 10. As discussed further below, the cooling assembly 28 circulates a fluid (e.g., liquid coolant or air) through the motor, thereby convectively cooling the motor. Simply put, the cooling assembly 28 convectively cools the motor 10 by dissipating heat into the environment surrounding the motor 10, as represented by arrows 29. It is worth noting that the motor may carry a plurality of cooling units 28, if desired.

Figure 2:
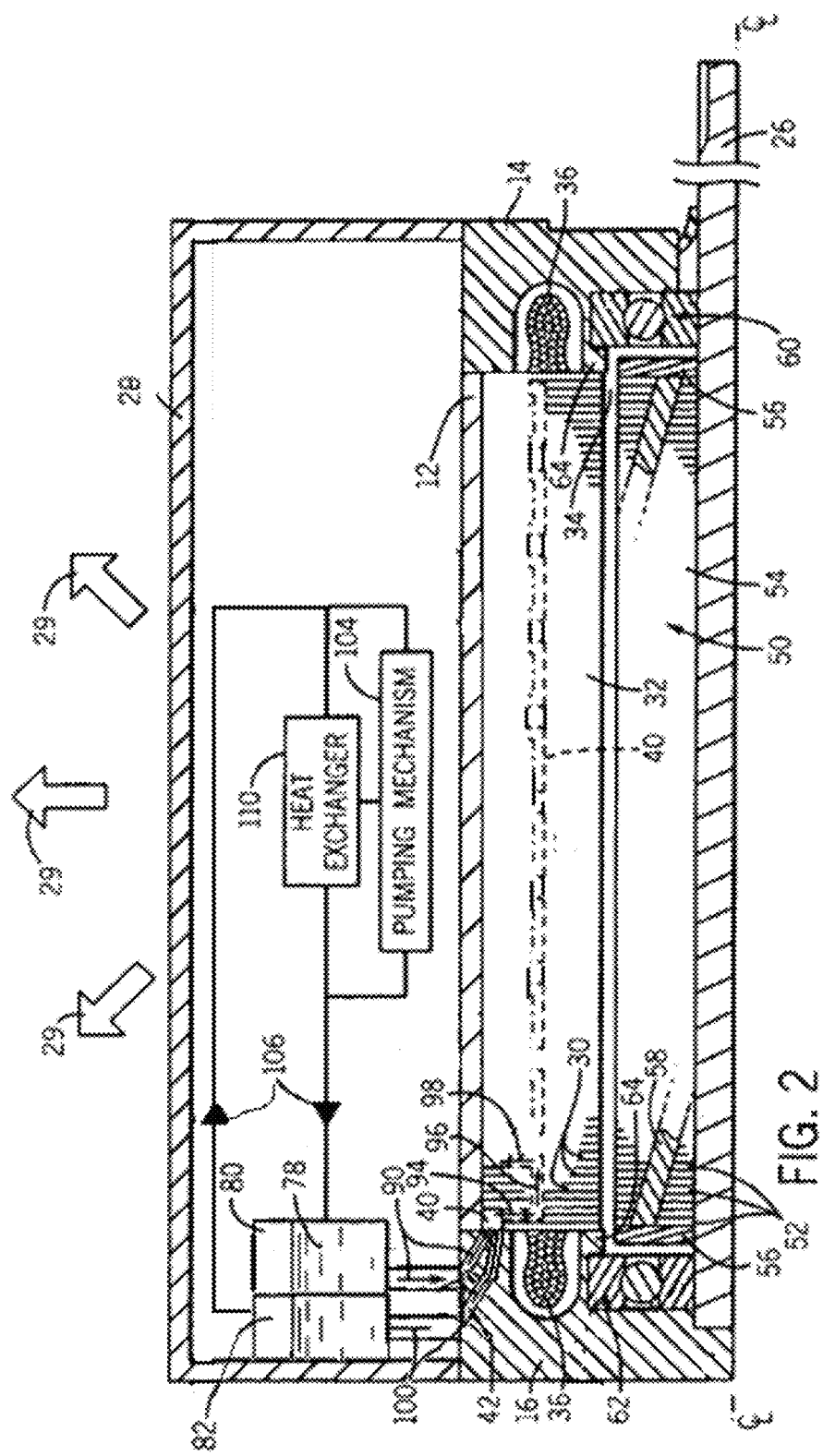
FIG. 2 is a partial cross-section view of the motor of FIG. 1 along line 2-2.

FIG. 2 is a partial cross-section view of the motor 10 of FIG. 1 along line 2-2. To simplify the discussion, only the top portion of the motor 10 is shown, as much of the structure of the illustrated motor 10 is essentially mirrored along its centerline. As discussed above, the frame 12 and the endcaps 14,16 cooperate to form an enclosure or motor housing for the motor 10. Within the enclosure or motor housing resides a plurality of stator laminations 30 juxtaposed and aligned with respect to one another to form a lamination stack, such as the illustrated contiguous stator core 32. In the exemplary motor 10, each stator lamination 30 includes features that cooperate with one another to form cumulative features for the contiguous stator core 32. For example, each stator lamination 30 includes a central aperture that cooperates with the central aperture of adjacent laminations to form a rotor chamber 34 that extends the length of the stator core 32 and that is sized to receive a rotor. Additionally, each stator lamination includes a plurality of slots (not shown for simplicity of illustration) disposed circumferentially about the central aperture. These slots cooperate to receive one or more stator windings 36, which are illustrated as coil ends in FIG. 2, that extend the length of the stator core 32. Furthermore, and as discussed further below, each stator lamination 30 includes a plurality of cooling apertures located radially inboard of the outer periphery of the lamination that, when arranged in a lamination stack, form micro channels and manifolds along the outer surface of the stator core 32 (i.e., lamination stack).

The cooperation of the plurality of cooling apertures of each lamination 30 defines an incremental segment of a closed and contiguous manifold 40 that extends axially through the stator core 32 radially inboard of the stator outer peripheral surface 38. In FIG. 2, portions of the closed manifold 40 located behind the cross-section view are illustrated in dashed line. The endcaps 14,16 each include passageways 42 that facilitate access to the manifolds 40 of an assembled motor 10. By way of example and as discussed further below, the passageways 42 provide an inlet or an outlet for circulating fluid through the manifolds 40. Further examples of the passageways (i.e., headers) are described below in reference to FIGS. 21-27. The laminations are envisaged as being substantially identical to one another and thus their alignment enables formation of the manifolds through the contiguous stator core. The characteristics of the laminations are discussed further below.

In the exemplary motor 10, a rotor assembly 50 resides within the rotor chamber 34. Similar to the stator core 32, the rotor assembly 50 comprises a plurality of rotor laminations 52 aligned and adjacently placed with respect to one another. Thus, the rotor laminations 52 cooperate to form a contiguous rotor core 54. The exemplary rotor assembly 50 also includes rotor end rings 56, disposed on each end of the rotor core 54, that cooperate to secure the rotor laminations 52 with respect to one another. It is worth noting, however, that the rotor may be a cast rotor or a fabricated rotor, for instance. When assembled, the rotor laminations 52 cooperate to form shaft chamber that extends through the center of the rotor core 54 and that is configured to receive the rotor shaft 26 therethrough. Once inserted, the rotor shaft 26 is secured with respect to the rotor core 54. Accordingly, the rotor core 54 and the rotor shaft 26 rotate as a single entity, the rotor assembly 50. The exemplary rotor assembly 50 also includes rotor conductor bars 58 disposed in the rotor core 54. As discussed further below, inducing current in the rotor assembly 50, specifically in the conductor bars 58, causes the rotor assembly 50 to rotate. By harnessing the rotation of the rotor assembly 50 via the rotor shaft 26, a machine coupled to the rotor shaft 26, such as a pump or conveyor, may operate. In alternative constructions, the rotor may be formed without conductor bars and be excited magnetically by a winding or permanent magnets, or with no excitation as in a reluctance machine.

To support the rotor assembly 50, the exemplary motor 10 includes drive-end and opposite drive-end bearing sets 60 and 62, respectively, that are secured to the rotor shaft 26 and that facilitate rotation of the rotor assembly 50 within the stationary stator core 32. During operation of the motor 10, the bearing sets 60,62 transfer the radial and thrust loads produced by the rotor assembly 50 to the motor housing. In summary, the bearing sets 60,62 facilitate rotation of the rotor assembly 50 while supporting the rotor assembly 50 within the motor housing, i.e., the frame 12 and the endcaps 14,16. To reduce the coefficient of friction between various components of the bearing sets 60,62, these components are coated with a lubricant. During operation, however, the physical interaction of and within the bearing sets 60,62 generate heat.

As discussed above, the exemplary motor 10 includes a cooling assembly 28 that dissipates heat generated in the motor 10 during operation. The cooling assembly 28 can comprise an assembly of parts or, alternatively, a self-contained unit housed in a single assembly as illustrated in FIG. 2. The cooling assembly 28 circulates a fluid, such as a liquid coolant 78 or forced air, through the stator core 32 to convectively cool the motor 10. An cooling assembly 28 may include input and output reservoirs 80,82, respectively, that maintain an adequate supply of liquid coolant 78. Alternatively, one reservoir may serve as input and output at the same time. The input reservoir 80 communicates with the manifolds 40 via the passageways 42 located in the rear endcap 16. Accordingly, liquid coolant 78 flows from the input reservoir 80 to the entrance of the manifolds 40 via the ingress passageway 42, as represented by arrows 90. However, it is worth noting again that the coolant may be any fluid, liquid or gaseous, including air.

As coolant 78 enters the manifolds 40, the impermeable surfaces of the respective stator laminations 30 cooperate to route the coolant 78 through the manifolds and the micro-channels of the stator core. In the exemplary embodiment, the stator laminations 30 cooperate to direct the flow of the coolant 78 (i.e., route the coolant) through the manifolds and micro-channels of the stator core 32. As the coolant 78 reaches the exit end of the return manifolds 40, an egress passageway 42, which may be located in the opposite drive-end endcap 16 in a cross flow heat exchanger arrangement, meets the return manifolds 40 and receives the coolant 78. This passageway 42 routes the fluid to the output reservoir 82, as represented by arrows 100.

To maintain sufficient pressure differential for circulating the coolant 78, the exemplary cooling assembly 28 includes a pumping mechanism 104. Alternatively, in the case of a gaseous cooling fluid, the pumping mechanism 104 includes a fan. As illustrated, the pumping mechanism 104 draws fluid from the output reservoir 82 and to the input reservoir 80, as represented by directional arrows 106. Advantageously, the pumping mechanism 104, the reservoirs 80,82, the passageways 42, the manifolds 40, and the micro-channels cooperate to form a closed system. Thus, circulating coolant 78 is conserved. Alternatively, if the cooling fluid is air, an open cooling system may be exploited, in which the air is taken from the atmosphere and discharged back. In this case, the headers may not be needed; the air may enter the end winding zone at, for instance, the non-drive end of the motor, pass through the parallel flow microchannel heat exchanger, and be discharged into the end winding zone on the drive end of the motor and further back to the atmosphere.

By circulating coolant 78 through the manifolds 40 and micro-channels, the coolant 78 draws in heat from the stator core 32. The proximity of the manifolds and micro-channels to the radially outward regions of the stator core 32 provides a mechanism for focusing cooling on such regions. Thus, the likelihood of uneven cooling or hotspots in the motor can be mitigated. In the exemplary embodiment, the manifolds and micro-channels comes into contact with a larger portion of the stator core 32 in comparison to a direct axial path and, as such, absorbs more heat into the circulating coolant 78.

Once the coolant 78 has circulated through the manifolds 40, a heat exchanger 110, located in the housing of the cooling assembly 28, facilities dissipation of the absorbed heat from the coolant 78 into the environment, as represented by arrows 29. By way of example, the heat exchanger 110 may include a series of flat plates across which the coolant 78 is directed. The flat plates increase the circulating surface area of the coolant 78 and, as such, facilitate improved dissipation of the absorbed heat in the coolant 78 to the environment. In any event, after the absorbed heat in the coolant 78 has been dissipated, the coolant 78 is directed back into the input reservoir 80 and the circulation cycle is repeated.

Figure 3:
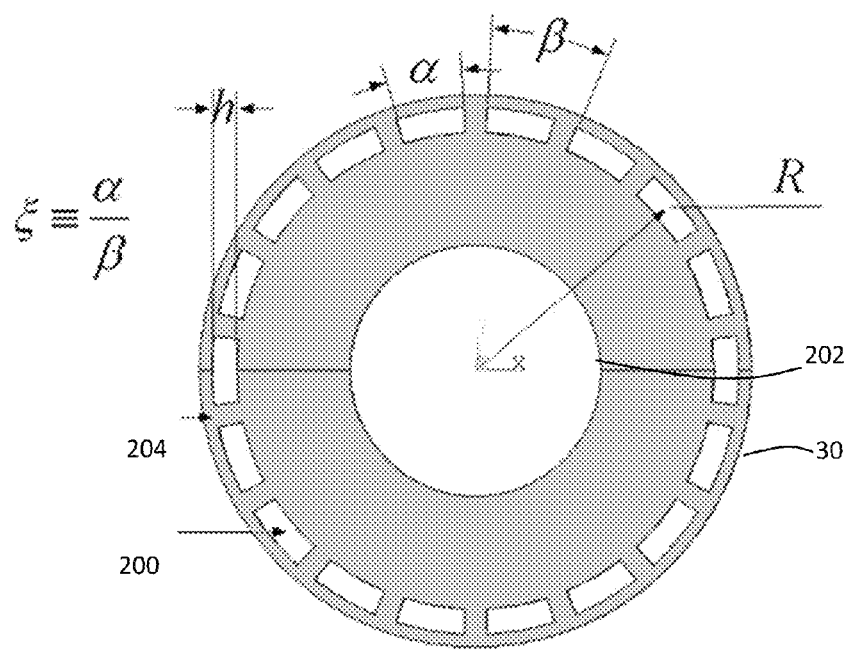
FIG. 3 illustrates an exemplary stator lamination with cooling apertures (slots for electric coils are not shown).

FIG. 3 provides a front view of an exemplary stator lamination 30. Apertures 200 are passages for coolant and the lamination winding slots on an inner diameter surface 202 of the lamination are not shown. The apertures are angularly spaced about the laminations and separated by bridges 204. The laminations may be round and all laminations may be substantially identical.

In FIG. 3, ($\xi$) represents the fraction of lamination circumference occupied by apertures $$\left(\text{i.e.,}\ \xi \equiv \frac{\alpha}{\beta}\right);$$

(α) represents the aperture angular length; (β) represents the angular period of the cooling apertures $$\left(\text{i.e.,}\ \beta = \frac{2\pi}{N_w}\right);$$

($N_w$) represents the number of apertures of the lamination. Also in FIG. 3, (R) represents the radius of the centerline of the cooling apertures, and (h) represents the cooling aperture radial dimension. These parameters may be used to calculate or estimate parameters associated with the micro-channel heat exchanger embedded in stator as will be described below.

Figure 4:
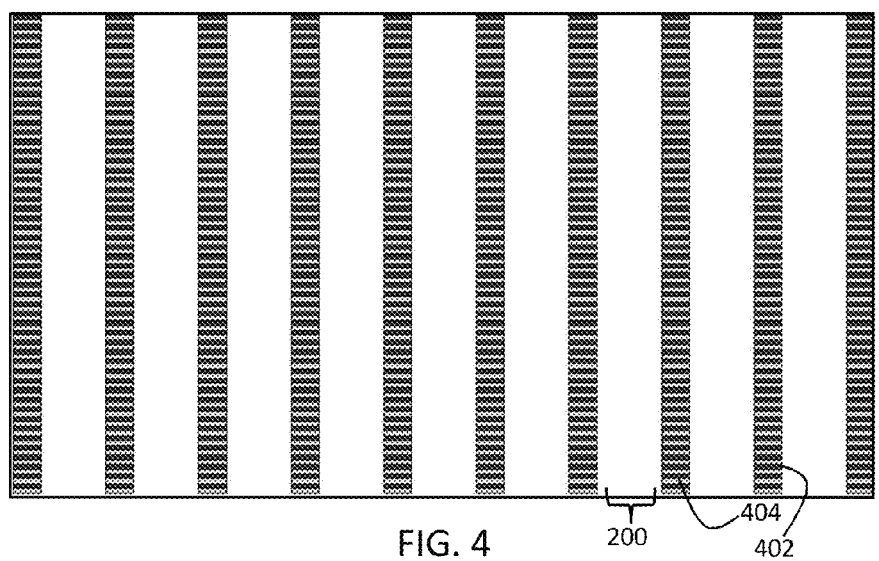
FIG. 4 is a schematic of the lamination stack before every second lamination is rotated relative to the first lamination.
Figure 5:
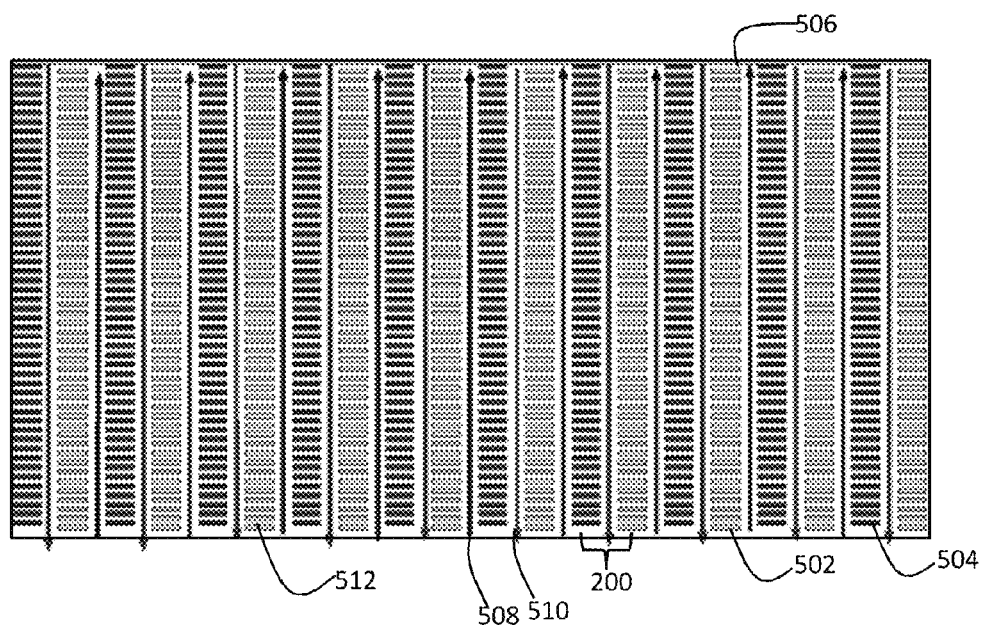
FIG. 5 is a schematic of the lamination stack after every second lamination is angularly staggered relative to the first lamination, thus forming the heat exchanger with micro-channels. Also, the flow schematics in the supply and discharge manifolds is shown for the case of the counter-flow arrangement.

FIGS. 4,5 show schematic representations of a cylindrical surface, passing through the centers of the apertures 200 in the stator core. This surface will be referred to as a middle surface of the heat exchanger. The radius of the middle surface is marked by (R) in FIG. 3. The bridge 204 of every second lamination 402 in the stack is shown in a darker color and the bridge 204 of every first lamination 404 in stack is shown in a lighter color for visualization purposes. In FIG. 4, every first and second lamination in the stack has their respective apertures 200 aligned directly (i.e., with no staggered arrangement). In FIG. 5, each second lamination 504 is rotated by a certain common angle in such a way, that the spacing of this lamination bridge is located in the slot of the first lamination 502. This rotation can be set to a stator slot pitch so that the stator slots remain aligned. An additional plate 506 without slots is added to a face of the stack (top of FIG. 5). With this added plate 506, the channels 40 are open to only one axial face of the stack (bottom of FIG. 5). In FIG. 5, the heat exchanger is comprised of relatively large vertical channels ('508'—supply manifolds; '510'—discharge manifolds), and small horizontal channels, connecting the vertical channels ('512'—the micro-channels). The width of the micro-channels may be equal to the lamination thickness as shown in the drawings. In the alternative, the width of the micro-channels may be equate to a multiple of the thickness of the lamination, for instance, if multiple successively stacked laminations are oriented in the same direction. By way of example, the micro-channel width may be set to a width equating to twice the thickness of the lamination by arranging two laminations back to back with the same relative angular stagger. While the drawings show a uniform width of the micro-channels throughout the axial length of the stator core, the width of the micro channels may vary as may be desired.

Figure 6:
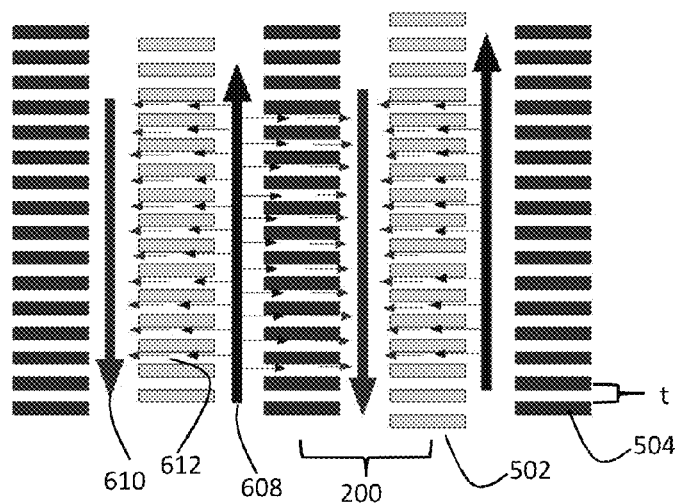
FIG. 6 is an enlarged detail view of the FIG. 5 schematic of flow between adjacent laminations in an angularly staggered arrangement highlighting the transverse flow between angularly adjacent manifolds in micro-channels.

FIG. 6 shows a more detailed schematic representation of the coolant flow pattern in manifolds. The arrows pointing upward indicate the supply (cold) flow 608 in the supply manifold, and the arrows pointing downward indicate the return (hot) flow 610 in the return manifold. This flow shown in FIG. 6 represents a counter-flow heat exchanger formed in the interior of the stator core. The arrows pointing to the left and the right indicate flow through the micro-channels 612. In the drawings, the width of the micro-channels 612 may be equal to the thickness of one lamination. The width of the micro-channels 612 in FIG. 6 is greatly exaggerated for better visibility. In each supply manifold 608, the flow splits toward two adjacent discharge manifolds by action of the flow in the micro-channels 612. In each return or discharge manifold 610, the flow from two adjacent supply manifolds merges by action of the flow in the micro-channels 612.

Figure 7:
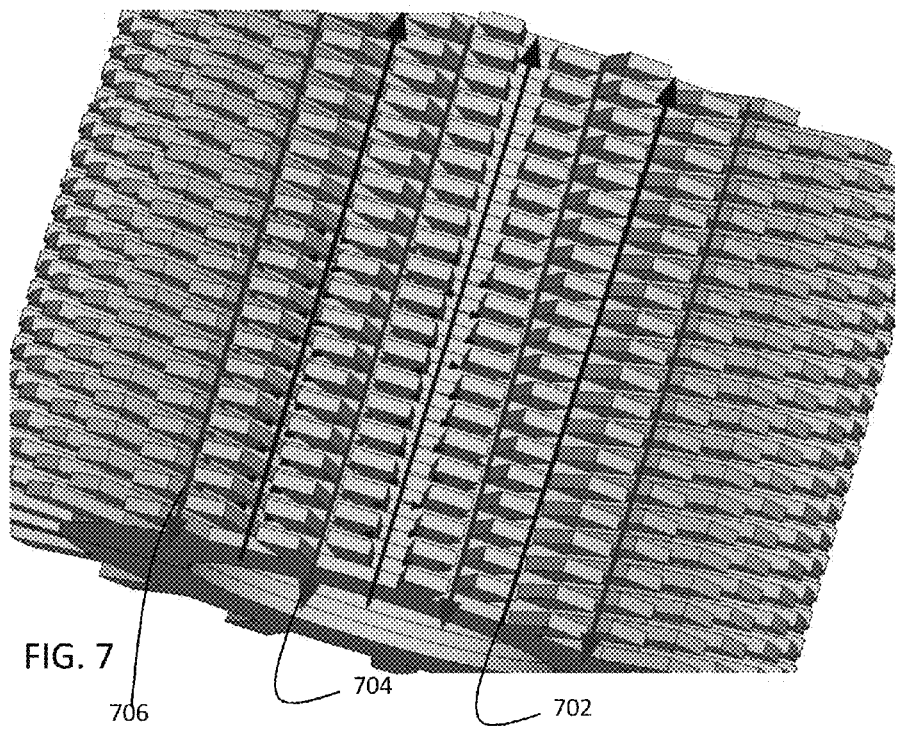
FIG. 7 illustrates adjacent laminations in an angularly staggered arrangement.

The flow schematics in FIG. 6 is known as the counter-flow heat exchanger, or a so-called U-type heat exchanger; the inlets and the outlets are located at one side of the stator, while at the other side of the stator the supply and discharge manifolds are closed. FIG. 7 provides additional detail. The supply manifolds are indicated by reference character 702 and return manifolds are indicated by reference character 704. Flow through the micro-channels is indicated by reference character 706. For illustrative purposes, the micro-channels and manifold in FIG. 7 are shown as if they are open at the stator outer periphery. The apertures are internal to the stator. Also in FIG. 7, the thicknesses of the laminations are greatly exaggerated for ease of illustration.

Figure 8:
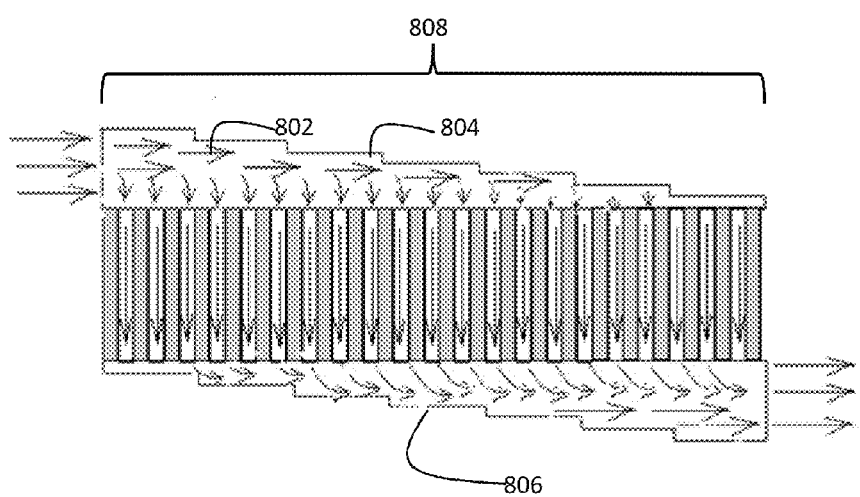
FIG. 8 provides the parallel flow heat exchanger schematics with a tapered manifold arrangement.

Although not shown in the drawings, the flow 802 through the supply and discharge manifolds 804,806 in the stator core may go in the same direction to form a parallel flow arrangement, or so-called Z-type heat exchanger. For instance, an inlet or supply of fluid may be introduced to supply manifolds at supply axial end of the stator. On the opposite axial end of the stator, i.e., the discharge end, the supply manifolds may be sealed so that fluid is forced into the micro-channels rather than being discharged directly from the discharge end of the stator. In a like manner, the discharge manifolds may be sealed at the supply end of the stator, so that fluid collected from the micro-channels is discharged from the discharge end of the stator. In order to evenly distribute the flow between the laminations, the supply and discharge manifolds may be tapered 804,806. It may be achieved in a number of ways. One way is using identical laminations but varying the angle of rotation of every second lamination along the axial length 808 of the stator. The width of the manifolds 804,806 in FIG. 8 varies in step increments depending upon the number of coil slots and the number of the cooling apertures to approximate a linear variation along the axial length 808 of the stator. For example, with 36 coil slots and 7 cooling apertures, 15 steps are possible with angle increment of 1.4286 degrees, which would provide a good approximation to the continuous linear tapering. Another way of tapering is using a nomenclature of laminations rather than identical laminations, for instance, 10 different groups of laminations, each next group having cooling apertures shifted angularly relative to the previous group in a way to achieve a tapered manifold with 10 step changes of the manifold width. The lamination cooling apertures may also be formed with a taper from a first axial side to a second axial side to better approximate a straight or linear side wall in the resultant manifold rather than a step configuration. Where liquid coolant is used in the micro-channels, supply and return headers or passageways are required. The supply header or passageway may feed all supply manifolds, and the discharge (or return) header or passageway collects the flow from all discharge (or return) manifolds. In the case of air cooling in a Z-type flow pattern, the headers are not needed.

Figure 9:
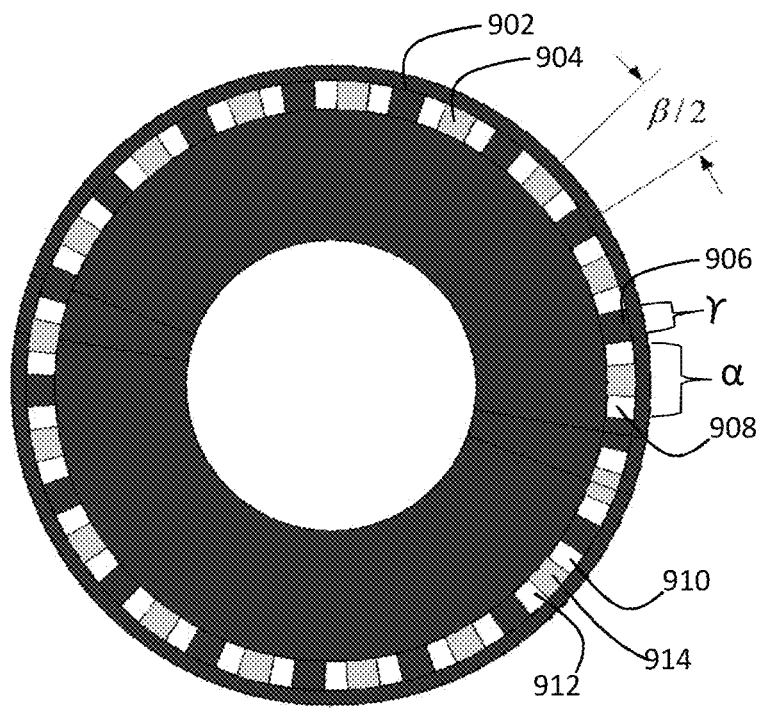
FIGS. 9-11 provide further illustration of adjacent laminations in an angularly staggered arrangement.

FIG. 9 provides additional detail of the spacing of the laminations to form a counter flow heat exchanger in the stator core. In FIG. 9, every second lamination 904 may be rotated relative to the first lamination 902 by the angle (β/2), which in FIG. 9 is (½) of the cooling aperture period (β). The spacing (γ) of the bridges 906 is smaller, than the angular length (α) of the apertures 908. The angular position of the spacing of every second lamination 904 would be in the center of the winding slot of the every first lamination. FIG. 9 shows such an arrangement where the first lamination 902 is shown in a darker color while the second lamination 904 is shown in a light color. In this arrangement, each aperture 908 in the first lamination 902 has essentially two channels 910,912 parallel to the axis of the stack forming manifolds separated by the bridge 914 of the second lamination 904. The lamination stack would have ($2 \times N_w$) manifolds. In FIG. 9, there are 16 apertures (i.e., $N_w=16$), and 32 manifolds. The manifolds may be numbered counterclockwise from 1 to ($2 \times N_w$). The manifolds 1, 3, 5, ..., (($2 \times N_w$)−1) are supply manifolds; the manifolds 2, 4, ..., ($2 \times N_w$) are discharge manifolds. Coolant flows from manifold 1 to manifold 2 and ($2 \times N_w$), from manifold 3 to manifolds 2 and 4, manifold 5 to manifolds 4 and 6, and so on, through the micro-channels.

As best described above in reference to FIG. 6, adjacent manifolds are connected by the micro-channels. The micro-channel cross-section may be defined by (t×h), where (t) is the lamination thickness, and (h) is the radial dimension of the slots. The angular length of the micro-channels is equal to the spacing ($\gamma$). The majority of the heat exchange area is in the micro-channels; as the number of micro-channels is very large, and the heat exchange area is very large.

The allowable angles of rotation of stagger for the laminations ($\phi$) (FIG. 9) may be provided by the equation:

$$\left[\phi = \frac{2\pi}{N_{teeth}} i\right]$$
$$i = 1, 2, \ldots$$

where $N_{teeth}$ is the number of stator teeth.

The angular period ($\beta$) of the heat exchanger may be calculated by the equation:

$$\left[\beta = \frac{2\pi}{N_w}\right]$$

The ratio of the angle of rotation to the angular period ($\lambda$) may be calculated by the equation:

$$\left[\lambda \equiv \frac{\phi}{\beta}\right]$$

Figure 10:
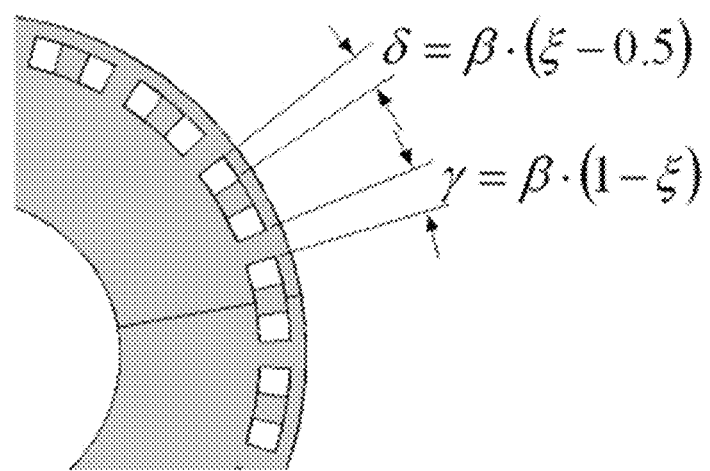

If ($\lambda=0.5$) (i.e., the laminations are rotated by ½ of the angular period), the resulting stack is shown in FIGS. 9 and 10. If ($\lambda=0.5$), and ($N_{teeth}=72$), then we obtain the following possible values for ($N_w$):

$$\left[N_w = \frac{N_{teeth}}{2i}\right]$$
$$i = 1, 2, \ldots ;$$
$$N_{teeth} = 72;$$
$$N_w = 36, 16, 12, 9, 6.$$

Typically, ($N_w$) is a multiple of 4, which allows rotation of the laminations by 90 degrees. This facilitates stacking of the laminations to form the core.

As shown in FIG. 10, the micro-channel angular length ($\gamma$) may be expressed in terms of (o) as follows:

$$[\gamma = \beta \cdot (1-\xi)]$$

As mentioned above the manifold angular length ($\delta$) may be expressed in terms of ($\xi$) as follows:

$$[\delta = \beta \cdot (\xi - 0.5)]$$

The number of micro-channels ($N_{mc}$), connecting adjacent manifolds, is provided by the following equation:

$$\left[N_{mc} = \frac{L_{core}}{2t}\right]$$

where ($L_{core}$) is the length of the lamination stack and (t) is the lamination thickness.

The flow area of each micro-channel has a perimeter that may be calculated by the following equation:

$$[2 \cdot t + 2 \cdot h]$$

The surface area of each micro-channel is approximately equal to:

$$[R \cdot \gamma \cdot (2 \cdot t + 2 \cdot h)]$$ where (R) represents the radius of the centerline of aperture and ($\gamma$) is the angular length of the micro-channels.

The total surface area of all micro-channels ($S_{mc}$) may be approximated by the equation:

$$[S_{mc} = R \cdot \gamma \cdot (2 \cdot t + 2 \cdot h) \cdot N_{mc} \cdot 2 \cdot N_w]$$
$$= \left[D \cdot \frac{2\pi}{N_w}(1-\xi) \cdot (2 \cdot t + 2 \cdot h) \cdot \frac{L_{core}}{2t} \cdot N_w\right]$$
$$= \left[2\pi L_{core} D \cdot (1-\xi)\left(\frac{h}{t}+1\right)\right]$$

where (D) is the diameter of the centerline of the cooling apertures or ($2 \times R$); (t) is the lamination thickness; and ($L_{core}$) is the length of the stator lamination stack.

In an example where ($\lambda=0.5$), $[\delta_{small}=\delta_{large}=\delta=\beta \cdot (\xi-0.5)]$. In such an arrangement, the total flow area in all manifolds ($S_{manifolds}$) may be approximated as:

$$[S_{manifold} = \pi D h \cdot (2\xi - 1)]$$

The average inlet/outlet flow velocity in manifolds ($V_m$) may be approximated as:

$$\left[V_m = \frac{Q}{\pi D h \cdot (\xi - 0.5)}\right]$$

where Q represents the total volumetric flow rate of the coolant.

The average flow velocity in the micro-channels ($V_{mc}$) may be approximated as:

$$\left[V_{mc} = \frac{Q}{N_w L_{core} h}\right]$$

where Q represents the total volumetric flow rate of the coolant.

The average flow velocity in the micro-channels ($V_{mc}$) may be expressed in terms of the average supply/return flow velocity in manifolds by the formula:

$$\left[V_{mc} = \frac{V_m}{N_w} \frac{\pi D}{L_{core}}(\xi - 0.5)\right]$$

The hydraulic diameter of the micro-channels ($d_{mc}$) may be represented by:

$$d_{mc} = \frac{4th}{2t+2h} \approx 2t$$

Typically, the flow in micro-channels is laminar with a very low Reynolds number ($Re_{mc}$). The friction coefficient (f) for fully developed laminar low in narrow rectangular tubes may be approximated by:

$$f \approx \frac{96}{Re_{mc}}$$

$$Re_{mc} = \frac{V_{mc}\rho d_{mc}}{\mu}$$

where ($Re_{mc}$) represents the Reynolds number representative of flow in the micro channel; ($\rho$) represents the density of the coolant, and (p) represents the dynamic viscosity of the coolant.

The Nusselt number ($Nu_{mc}$) for fully developed flow in narrow rectangular tubes is about 7:

$$Nu_{mc} \equiv \frac{Hd_{mc}}{k_c} \approx 7$$

where (H) represents the film coefficient in the micro-channel, ($d_{mc}$) represents the hydraulic diameter of the micro-channel, and ($k_c$) represents the coolant thermal conductivity.

The film coefficient in micro-channels (H) may be approximated as follows:

$$H = Nu_{mc}\frac{k_c}{d_{mc}} \approx \frac{7k_c}{d_{mc}} \approx \frac{3.5k_c}{t}$$

For a typical lamination thickness of 0.0185" and oil as a coolant, the film coefficient is about 1070 watt/(m$^{2\cdot\circ}$ C.). An average over the stator outer surface area film coefficient ($h_{\mathit{eff}}$) may be approximated by the following expression:

$$h_{\mathit{eff}} = (1-\xi)k_s\sqrt{\frac{2H}{k_s t}} \cdot \tanh\left(h\sqrt{\frac{2H}{k_s t}}\right) \text{ or }$$

$$h_{\mathit{eff}} = (1-\xi)\frac{k_s}{t}\sqrt{\frac{Nu_{mc}k_c}{k_s}} \cdot \tanh\left(\frac{h}{t}\sqrt{\frac{Nu_{mc}k_c}{k_s}}\right)$$

where ($k_s$) represents the in-plane lamination thermal conductivity; and ($k_c$) represents the coolant thermal conductivity. These formulas are approximations used for evaluating the potential effectiveness of the embedded micro-channel heat exchanger relative to other methods of stator cooling.

Figure 11:
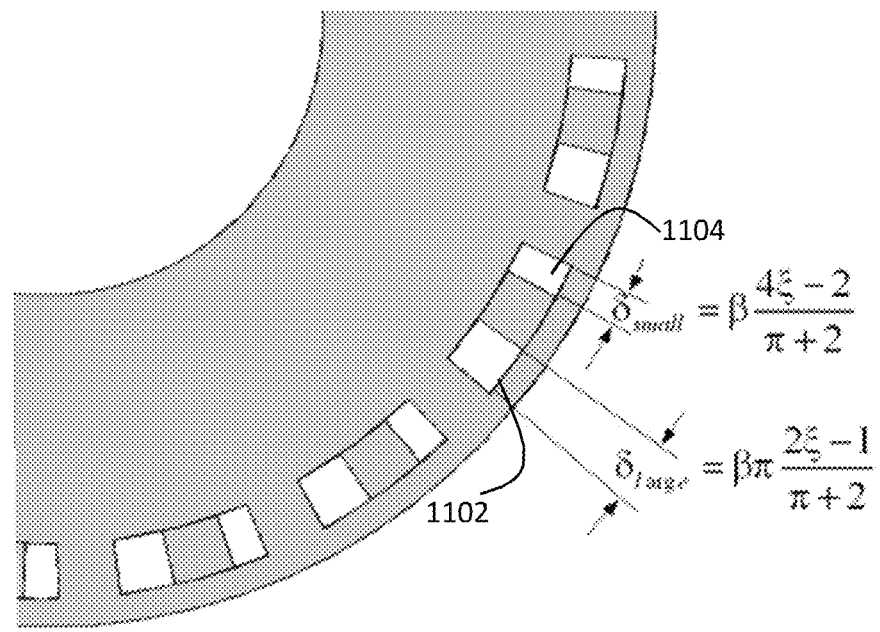

As shown in FIG. 11, a counter-flow heat exchanger arrangement may be configured so that the width of the return manifold 1102 is a factor of ($\pi/2$) larger than the width of the supply manifold 1104, for instance, to achieve uniform flow in the micro-channels. The width of the return manifold may have an angular length calculated as ($\alpha-\phi$), and the supply manifold may have an angular length calculated as ($\alpha+\phi-\beta$). Therefore, the condition of uniform flow may be represented by:

$$\alpha - \phi = \frac{\pi}{2}(\alpha + \phi - \beta)$$

The angle of staggering or rotation ($\phi$) (measured counter-clockwise in the drawings) need not be equal to half of the slot period. The angle ($\phi$) is a multiple of the teeth pitch of the stator, and may be calculated by an equation using the definitions: ($\phi=\lambda\cdot\beta$); and ($\alpha=\xi\cdot\beta$), the condition of uniform flow may be represented by:

$$\xi\cdot\beta - \lambda\cdot\beta = \frac{\pi}{2}(\xi\cdot\beta + \lambda\cdot\beta - \beta)$$

$$\Rightarrow \left[\xi - \lambda = \frac{\pi}{2}(\xi + \lambda - 1)\right]$$

$$\Rightarrow \left[\lambda = \frac{\pi}{\pi+2} - \xi\cdot\frac{\pi-2}{\pi+2}\right]$$

$$\left[\xi\cdot\frac{\pi}{\pi-2} - \frac{N_w i}{N_{teeth}}\cdot\frac{\pi+2}{\pi-2}\right] = \left[\frac{1}{2} + \frac{\pi+2}{\pi-2}\left(1 - \frac{N_w i}{N_{teeth}}\right)\right]$$

$$i = 1, 2, \ldots$$

Since ($\xi$) must be greater than 0.5, the restriction [$N_w i < N_{teeth}$] may be applied. For a given ($N_{teeth}$) based upon motor design requirements, there are only a limited number of combinations (MO which satisfies the restriction (0.5<$\xi$<1). The tables of FIGS. 15-17 provide illustrative examples. With the factor ($\xi$) calculated, the parameter ($\lambda$) and the angle ($\phi$) are determined by the following equations:

$$\lambda = \frac{N_w i}{N_{teeth}}$$

$$\phi = \frac{2\pi}{N_{teeth}}i$$

The angular width of the supply manifolds 1104 may be provided by the equation:

$$\delta_{small} = \beta(\xi + \lambda - 1)$$

The angular width of return manifolds 1102 may be provided by the equation:

$$\delta_{large} = \beta(\xi - \lambda)$$

Applying the restriction (0.5<$\xi$<1), then the manifold angular widths may be calculated as follows (FIG. 11 provides additional detail):

$$\delta_{small} = \beta\frac{4\xi - 2}{\pi + 2}$$

$$\delta_{large} = \beta\pi\frac{2\xi - 1}{\pi + 2}$$

As described above the laminations may be angularly staggered as desired to create a desired manifold size. The same principles may be used in designing a heat exchanger by "flipping" the laminations to create a desired manifold size.

Figure 12:
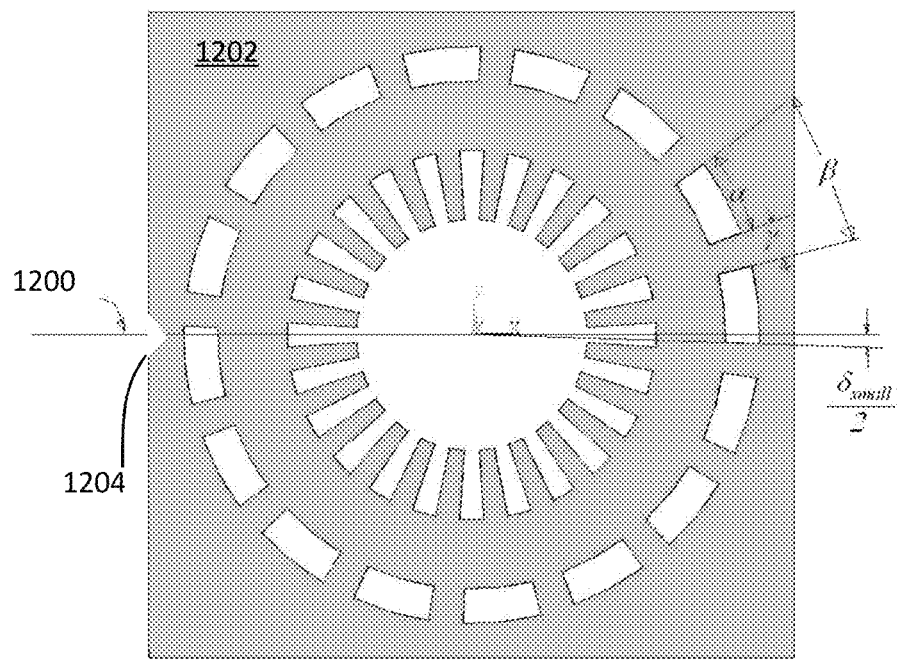
FIGS. 12-14 provide illustrations of an alternate embodiment of a lamination having an asymmetric cross section about a flip axis.
Figure 13:
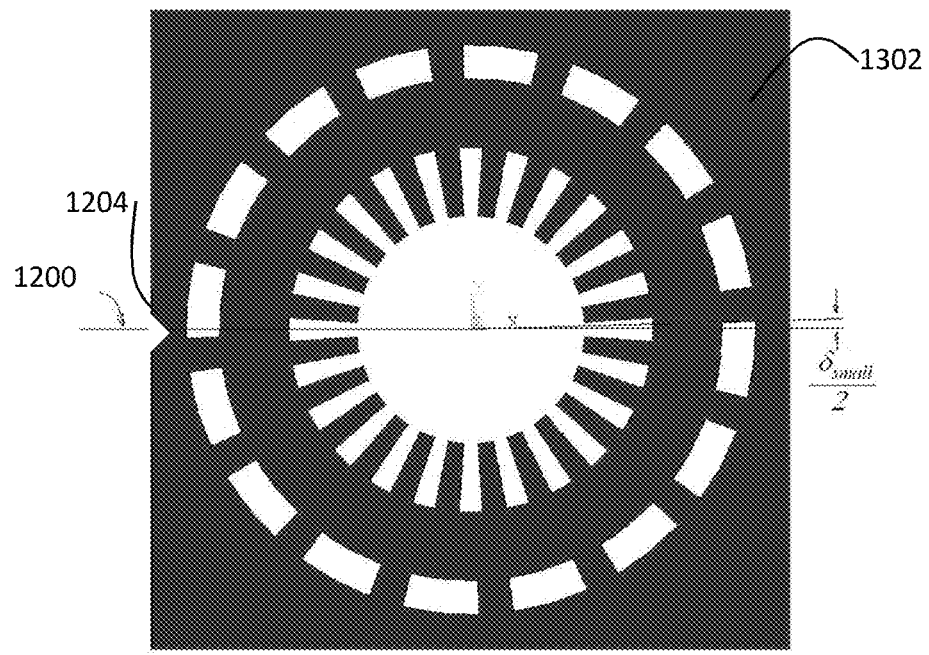
Figure 14:
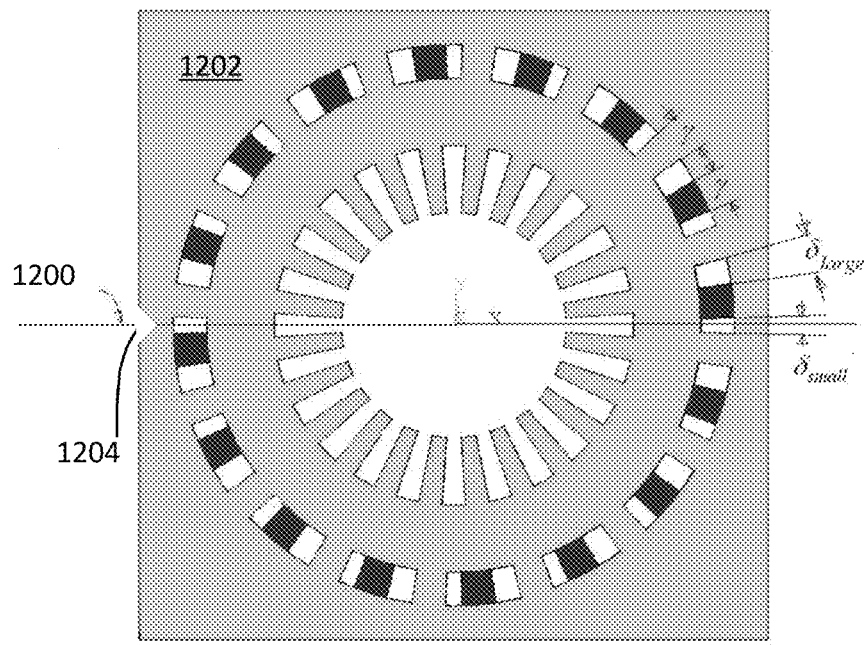

FIGS. 12-14 provide an illustration of a lamination that may be used in connection with a lamination flip method of assembling the lamination stack. In the lamination-flip method, the independent parameters defining the geometry of the heat exchanger may be independent of the number of the stator teeth. Also, in the in the lamination-flip method, the laminations may be any shape, e.g., round, square, rectangular, or hexagon. All laminations may be identical but not symmetrical. As a result, the lamination looks different depending upon which side is viewed. The lamination has a flip axis 1200, which is a line in the plane of lamination passing through the center of a designated side ("side A" ("1202"; FIG. 12), the opposite side being "side B" ("1302"; FIG. 13)). The flip axis 1200 is the symmetry line of one arbitrarily chosen aperture, the flip axis 1202 crosses a cooling aperture, and the angular distance between the flip axis and the closest radial edge of the cooling apertures spacers should be equal to $$\frac{\delta_{small}}{2}.$$

The intersection of the flip axis with the outer edge of the lamination may be marked by a locator nib 1204.

Initially, all laminations in the stack may be aligned with side A up. The lamination stack is divided in half, and the second part turned upside down, so that all laminations in the corresponding stack would have side B up. The final stack is assembled taking the first lamination from the first stack half, the second lamination from the second stack half, the third lamination from the first stack half, and so on. The nibs 1204 of all laminations may be aligned in the process of forming the final stack. Alternatively, the laminations may also be rotated while being flipped. Electrical steel typically has slightly different properties in the rolling direction and in the transverse direction, and it is a common practice to rotate ½ of laminations by 90° angle. Because the number of stator teeth is typically a multiple of 4, the coil slots remain aligned under such a rotation. The cooling apertures also will remain aligned, if the number of the cooling apertures is a multiple of 4. The flow through the micro-channels may also be near-uniform, if the hydraulic resistance of the manifolds is much smaller than the hydraulic resistance of the micro-channels.

With the foregoing design considerations, the electrical machine may be provided with an internal heat exchanger with an area an order of magnitude larger than the heat exchanger area in the existing motor cooling schemes. The heat exchanger may have laminar flow in micro-channels with very low velocity, thus greatly decreasing the pressure drop across the micro-channels. The heat exchange may have a relatively high local film coefficient due to the small width of the micro-channel. The pressure required to move the coolant is an order of magnitude lower than in existing systems, thereby decreasing motor loss by decreasing the power of a pump.

Figure 18:
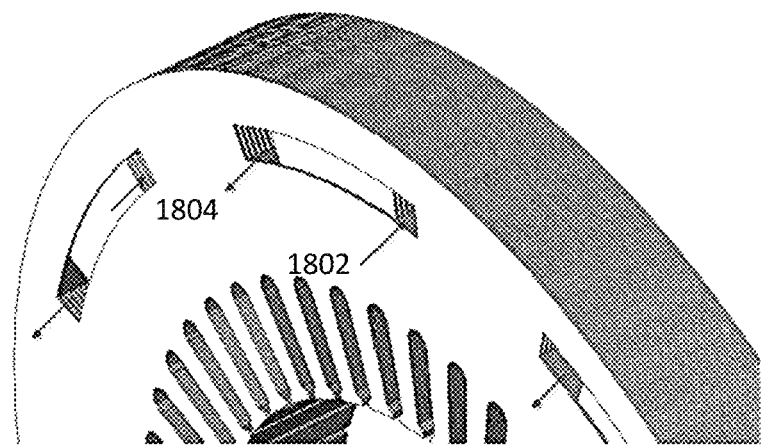
FIG. 18 shows another embodiment of a representative portion of a stator core and supply and return manifolds.
Figure 19:
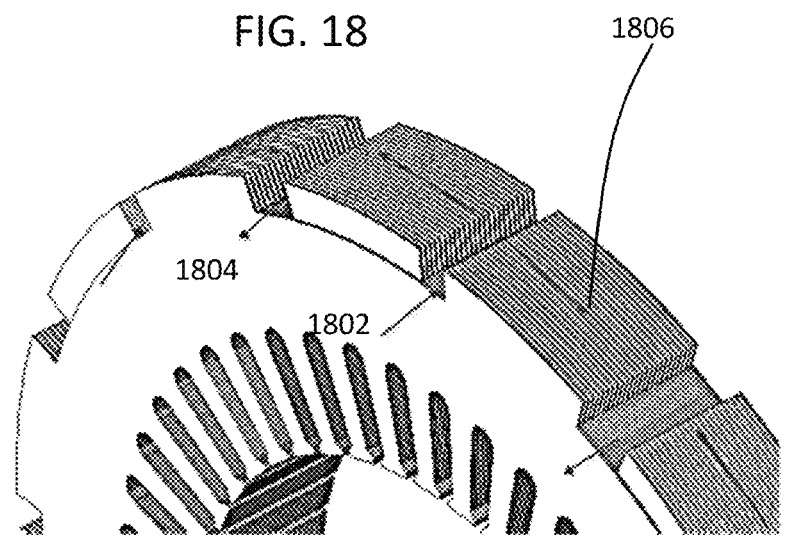
FIG. 19 provides additional detail of the stator core portion of FIG. 18 with an outer periphery of the stator core removed to show the flow in the micro channels.

FIGS. 18 and 19 show another embodiment of a portion of a stator core with a micro channel heat exchanger formed therein. FIG. 18 shows an enlarged partial view of a stator core with microchannel heat exchanger. In FIG. 19, the outer periphery of the stator laminations has been removed to provide further details of the manifolds and the micro-channel. In FIGS. 18 and 19, the stator laminations are arranged to form axially extending supply manifolds 1802 and return manifolds 1804 with micro-channels 1806 extending therebetween. The stator core may be formed by flipping every other lamination during a stacking operation. All laminations maybe formed identically. Because the number of return manifolds and supply manifolds 1802,1804 may be provided in a number to be divisible by four, laminations may also be rotated 90° increments in order to facilitate stacking, as described above.

Figure 20:
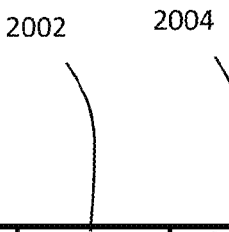
FIG. 20 is a chart showing parameters associated with a representative stator microchannel heat exchanger with various cooling media.

It has been found that a motor formed with a stator with micro channels as described above has improved cooling capabilities. FIG. 20 provides a comparison of the effective film coefficients established in a microchannel heat exchanger of a representative motor. In column 2002, the parameters corresponding to cooling with an automatic transmission fluid are shown, and specifically, an effective film coefficient of 4864 w/m$^{2\cdot\circ}$ C. may be attained. In column 2004, the values corresponding to cooling with a 50% water-ethylene glycol blend ("WEG") are shown, and specifically, an effective film coefficient of 8472 w/m$^{2\cdot\circ}$ C. may be attained. FIG. 20 also indicates that the Reynolds number for flow micro-channel is laminar and extremely low. Additionally, FIG. 20 also indicates that the estimated pressure drop across the micro-channel heat exchanger is low. These parameters achieved for cooling with the micro channel heat exchanger has been proven to be improved in comparison to other heat exchanger scenarios, including those employing turbulent flow.

Figure 21:
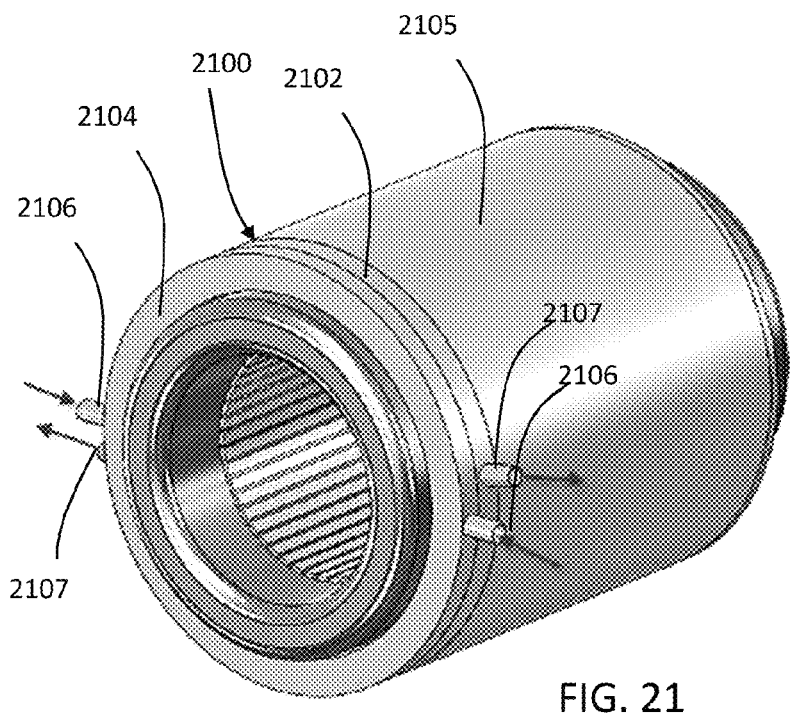
FIG. 21 shows an embodiment of headers for the supply and return manifolds of the stator core represented in FIG. 18.
Figure 22:
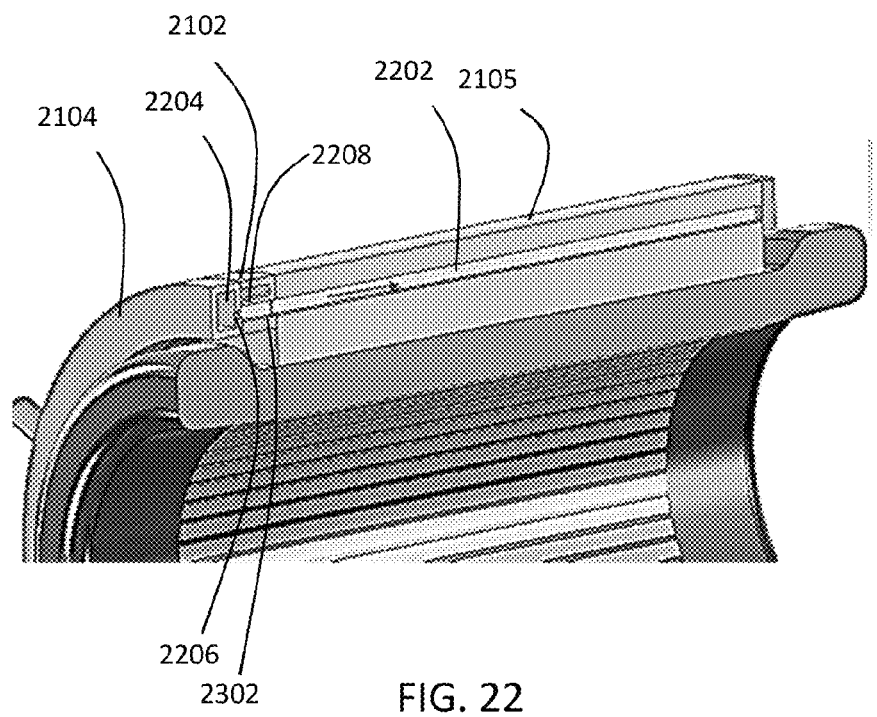
FIG. 22 is a partial cross-sectional view of stator core and headers of FIG. 21 showing a supply manifold through the stator core.
Figure 23:
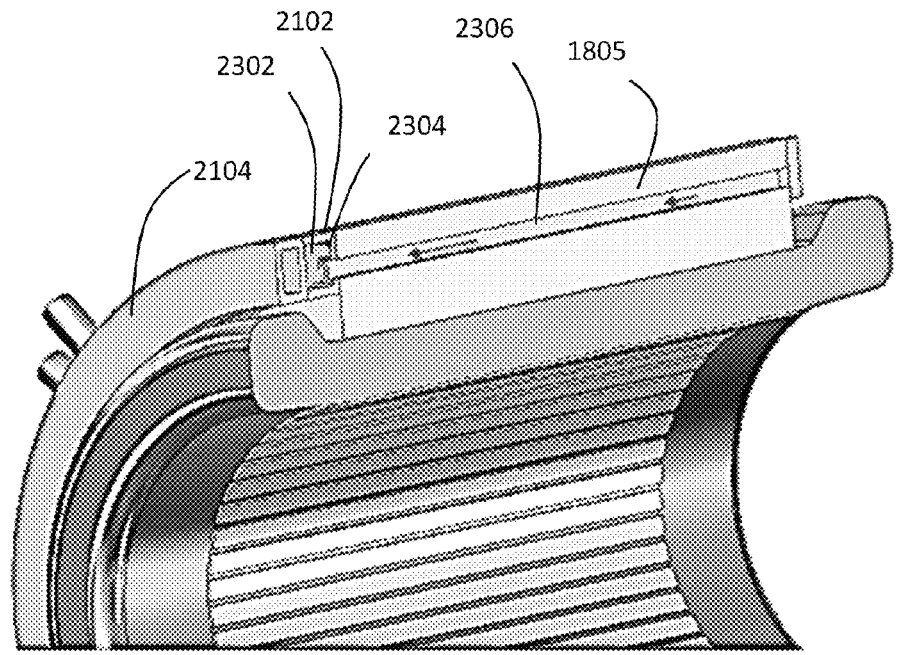
FIG. 23 is a partial cross-sectional view of stator core and headers of FIG. 21 showing a supply manifold through the stator core.
Figure 24:
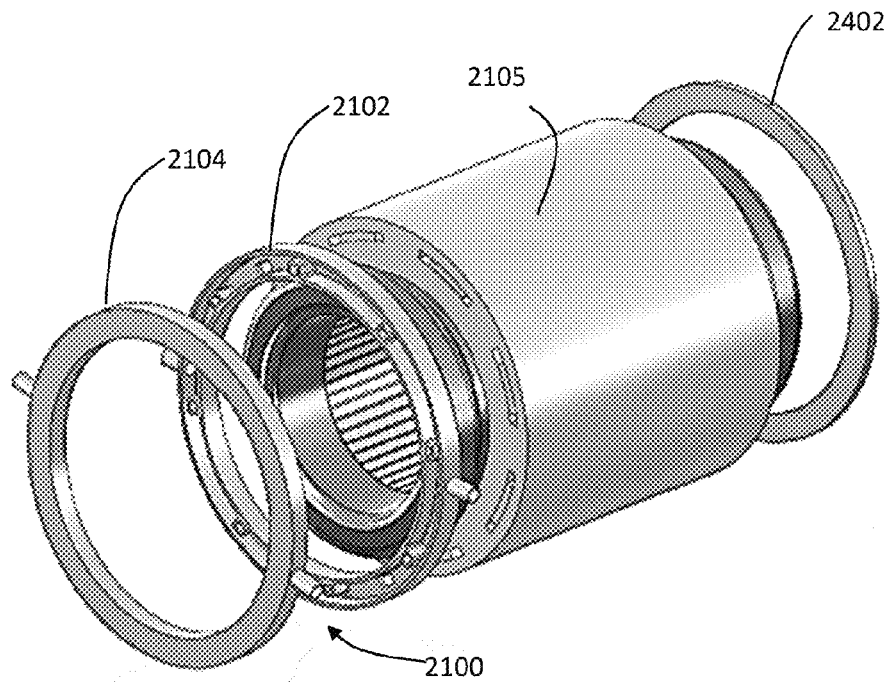
FIG. 24 is an exploded view of the stator core and headers of FIGS. 21-23.

FIGS. 21-24 provide illustrations of one embodiment of a header assembly 2100 used to form a counter-flow, micro-channel heat exchanger. In FIG. 18, the header assembly 2100 comprises an inner ring 2102 and outer ring 2104 that cooperate to form the header assembly attached to the stator 2105. The outer ring 2104 may be configured to direct a supply of coolant to the supply manifolds 2202 of the micro-channel heat exchanger. As shown in FIG. 21, the outer ring 2104 of the header assembly receives influent coolant from supply nipples 2106 located at the 3 and 9 o'clock positions on the outer ring. As shown in FIG. 21, the inner ring 2102 of the header assembly discharge effluent coolant from discharge nipples 2107 located at the 3 and 9 o'clock positions on the inner ring. As shown in FIG. 22, the outer ring 2104 of the header assembly comprises a channel 2204 with a plurality of outlet ports 2206 on an interior surface of the outer ring. When assembled with the inner ring 2102, the outer ring outlet ports communicate directly with the supply manifolds of the stator laminations. As shown in FIG. 23, the inner ring 2102 may comprise a channel 2302 with inlet ports 2304 formed in an interior surface of the inner ring. The inner ring 2102 may abut the outermost lamination in the stack and be arranged such that the inlet ports 2304 align with and communicate directly with the discharge manifolds 2306 of the stator. As shown in FIG. 22, passageways 2208 may extend across the channel 2302 of the inner ring 2102. When the inner ring 2102 is assembled with the outer ring 2104 and mounted to the stator core, the passageways 2208 may be brought into register with outer ring outlet ports 2206 and the stator core supply manifolds 2202. In this way, the passageways 2208 extend between the outer ring 2204 and the lamination stack and separate the outer ring from the inner ring. The passageways 2208 may be formed on the outer ring 2204 and project through the inner ring channel 2302 to extend to the supply manifolds 2202 of the stator core. The passageways 2208 may be formed in the inner ring channel 2302 and align with the outer ring output ports 2206 when the outer and inner rings 2104,2102 are assembled. The inner ring 2102 forms a discharge header portion that receives effluent flow from the discharge manifolds of the stator 2105, and directs the effluent flow to an external heat exchanger ('110' of FIG. 2). As shown in FIG. 24, a backing plate 2402 is placed on the axial end of the stator opposite the header assembly 2100 to form the cross flow micro-channel heat exchanger.

Figure 25:
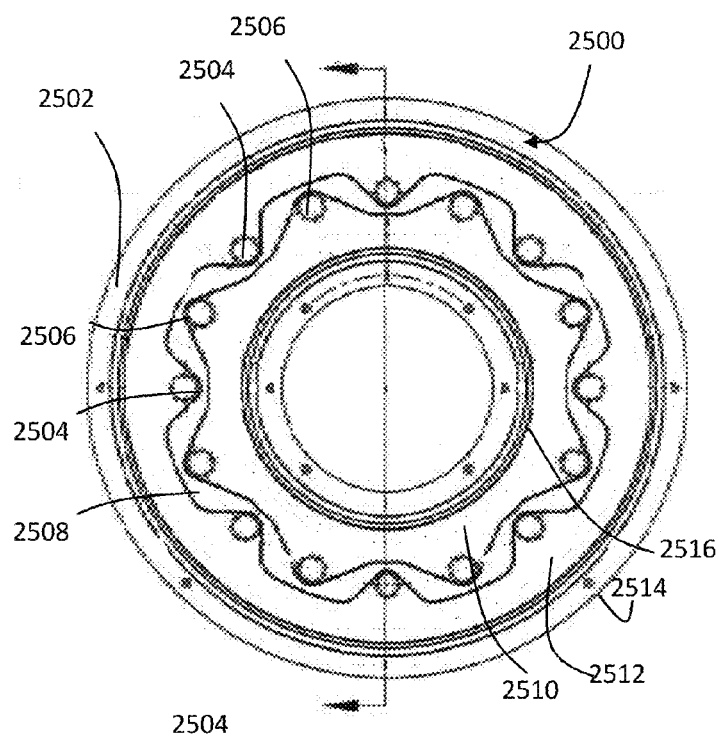
FIG. 25 is a front view of another embodiment of a header for use in a stator with 8 supply manifolds and 8 return manifolds.
Figure 26:
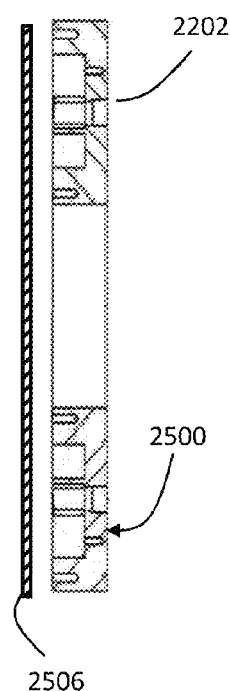
FIG. 26 is a cross-sectional view of the header of FIG. 25.
Figure 27:
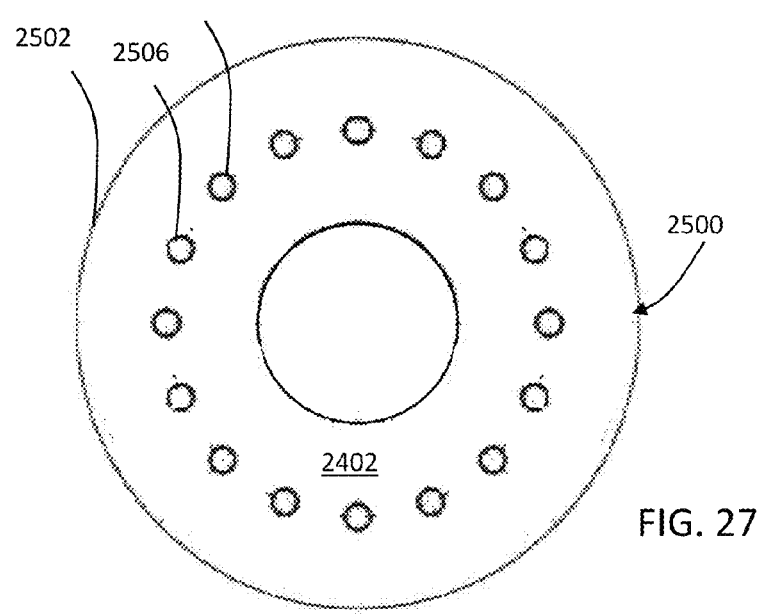
FIG. 27 is a rear view of the header of FIG. 25.

FIGS. 25-27 show another embodiment of a header 2500 that may be used on a motor with a micro-channel heat exchanger formed in the stator. FIG. 25 shows a front view of the header plate 2502. The header plate has eight inlet ports 2504 that communicate with the supply manifolds of the stator core to provide influent coolant to the heat exchanger. The header plate 2502 has eight outlet ports 2506 that communicate with the return manifolds of the stator core to collect effluent coolant from the heat exchanger. A separator 2508 with an undulating shape extends between the inlet and outlet ports 2504,2506 in an alternating pattern to form a return header portion 2510 and a supply header portion 2512 of the header plate. The header plate 2502 may be attached to the stator core 2510 of the motor directly in a manner where the flat rear 2502 surface abuts the outermost lamination of the lamination stack. In this configuration, the inlet and outlet ports 2504,2506 may communicate directly with the respective supply and return manifolds of the stator core microchannel heat exchanger.

The inlets (note shown) for the supply header 2504 may be provided at the 3 and 9 o'clock positions to provide uniform flow into the stator core supply manifolds. The outlets (not shown) of the discharge header 2506 are provided at the lowest point (i.e., 6 o'clock position) to enable the system to be drained. A purge valve (not shown) may be located on the header plate 2202 at the 12 o'clock to enable gas pockets to be purged from the system during filling. Adhesive and other gasket materials may be used between the header plate back surface and the outermost stator lamination to improve sealing therebetween.

The methods described herein may also be applied to the construction of rotors and cooling systems of rotors of electric motors with laminated rotors; and the construction of transformers and cooling systems of transformers with laminated cores.

In view of the foregoing, it will be seen that the several advantages are achieved and attained. The embodiments were chosen and described in order to best explain a practical application to thereby enable others skilled in the art to best utilize the principles herein in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An electric machine, comprising:
   first and second end portions;
   a rotor; and
   a stator core comprising a plurality of stator laminations disposed between the first and second end portions, the plurality of stator laminations having an outer periphery, wherein the plurality of stator laminations cooperate to form a central opening configured to receive the rotor, each of the laminations having teeth about the central opening such that when the laminations are stacked side-by side to form the stator core, the plurality of teeth of adjacent laminations cooperating to form slots disposed circumferentially about the central opening that are configured to receive a plurality of stator windings, each of the laminations having a plurality of cooling apertures angularly spaced about the central opening with the cooling apertures separated by bridges, adjacent laminations being angularly offset in a manner such that the bridges of one lamination are juxtaposed with the cooling apertures of an axially adjacent lamination with portions of the cooling apertures of one lamination aligned with portions of the cooling apertures of an axially adjacent lamination, the aligned portions of the cooling apertures cooperating on one side of the bridges to form supply manifolds and on an opposite side of the bridge to form discharge manifolds that extend axially along a length of the stator core, the angularly offset cooling apertures of axially adjacent laminations forming a plurality of flow paths transverse to the manifolds and angularly between axially adjacent laminations and adjacent manifolds, the cooling apertures being radially inward of the outer periphery of the stator laminations.

2. The electric machine as recited in claim 1, wherein the stator laminations are substantially identical to one another.

3. The electric machine as recited in claim 2, wherein a first lamination of the plurality of substantially identical laminations is at a first angular orientation with respect to a center axis of the machine and a second lamination of the substantially identical laminations is at second angular orientation with respect to the center axis.

4. The electric machine as recited in claim 1, wherein the stator core is configured such that fluid in adjacent manifolds flows in opposite directions.

5. The electric machine as recited in claim 4, wherein the manifolds configured to collect fluid from the transverse flow path between the laminations and adjacent manifolds are about 1.57 times wider than the manifolds configured to supply fluid for the traverse flow path between the laminations and adjacent manifolds.

6. The electric machine as recited in claim 1, wherein each lamination has a first axial side facing a first direction and a second axial side facing opposite the first direction, and the lamination has an asymmetric cross-section such that the first axial side is different from the second axial side when the lamination is flipped and the second axial side faces the first direction.

7. The electric machine as recited in claim 1, wherein a first lamination of the plurality of laminations is oriented at a first orientation in the stator core and a second lamination is oriented in mirror-image orientation with respect to the first orientation.

8. The electric machine as recited in claim 1, comprising a cooling unit configured to circulate fluid through the manifolds.

9. The electric machine as recited in claim 8, further comprising headers communicating between the cooling unit and the manifolds.

10. An electric machine, comprising:
    a rotor; and
    a core comprising a plurality of laminations, wherein the plurality of laminations cooperate to form a central aperture configured to receive the rotor, the plurality of laminations having cooling apertures, adjacent laminations having an alternating configuration of cooling apertures along an axial length of the core, the alternating configuration of the cooling apertures of adjacent laminations being cooperative to form (i) a plurality of closed passageways for routing fluid in opposite directions axially along a length of the stator; and (ii) a plurality of channels extending angularly between the closed passageways and between each of the laminations along the length of the core; and wherein the laminations have an outer periphery and the closed passageways and angular channels are radially inward of the outer periphery.

11. The electric machine as recited in claim 10, wherein the plurality of laminations are identical.

12. The electric machine as recited in claim 10, wherein the closed passageways configured to collect fluid from the channels are about 1.57 wider than the closed passageways configured to supply fluid to the channels.

13. The electric machine as recited in claim 10, wherein each lamination of the plurality of laminations has an asymmetric lamination cross-section.

14. The electric machine as recited in claim 10, wherein each lamination has a first axial side facing a first direction and a second axial side facing opposite the first direction, and the lamination has an asymmetric cross-section such that the first axial side is different from the second axial side when the lamination is flipped and the second axial side faces the first direction.

15. An electric machine, comprising:
   a rotor; and
   a stator core comprising: (i) a plurality of stator laminations, wherein the plurality of stator laminations cooperate to form a central opening configured to receive the rotor, (ii) a plurality of slots disposed circumferentially about the central opening and configured to receive a plurality of stator windings, and (iii) intermediate apertures disposed between the plurality of slots and an outer periphery of the stator core, the intermediate apertures being disposed angularly about the center opening, the intermediate apertures of axially adjacent laminations being angularly offset in a manner such that portions of the apertures of axially adjacent laminations are aligned in a manner to form: (A) axial channels to allow a fluid to flow axially in opposite directions through the stator core, and (B) angular channels to allow the fluid to flow angularly through the intermediate apertures of each of the adjacent laminations into the angular channels along a length of the stator core and into the axial channels.

16. The electric machine as recited in claim 15, wherein the stator laminations are substantially identical to one another.

17. The electric machine as recited in claim 16, wherein first lamination of the plurality of substantially identical laminations is at a first angular orientation in the stator core and a second lamination of the substantially identical stator laminations is at a second angular orientation within the stator core.

18. The electric machine as recited in claim 16, wherein a first lamination of the plurality of laminations has a first cross-section and a second lamination of the plurality of laminations has a second cross-section that is a mirror image of the first cross-section.

19. The electric machine as recited in claim 16, wherein the manifolds configured to collect fluid from the a transverse flow path between the laminations and adjacent manifolds are about 1.57 times wider than the manifolds configured to supply fluid for the transverse flow path between the laminations and adjacent manifolds.

20. The electric machine as recited in claim 16, wherein a first lamination of the plurality of laminations is oriented at a first orientation in the stator core and a second lamination is oriented in mirror-image orientation with respect to the first orientation.

21. The electric machine as recited in claim 16, comprising a cooling unit configured to circulate fluid through the closed passageway.

22. The electric machine as recited in claim 21, comprising headers communicating between the cooling unit and the manifolds.

* * * * *